(12) United States Patent　　(10) Patent No.:　US 12,600,426 B2

Cervino et al.　　(45) Date of Patent:　Apr. 14, 2026

(54) VEHICLE WITH ADVERTISING DISPLAY

(71) Applicant: ILLUMINATED BOX SOLUTION PTY LTD, Merrylands (AU)

(72) Inventors: Carl Cervino, Merrylands (AU); Paul Vickery, Halifax (GB)

(73) Assignee: ILLUMINATED BOX SOLUTION PTY LTD, New South Wales (AU)

( * ) Notice: Subject to any disclaimer, the term of this patent is extended or adjusted under 35 U.S.C. 154(b) by 0 days.

(21) Appl. No.: 18/284,976

(22) PCT Filed: Mar. 29, 2022

(86) PCT No.: PCT/AU2022/050285

§ 371 (c)(1),
(2) Date: Sep. 29, 2023

(87) PCT Pub. No.: WO2022/204754

PCT Pub. Date: Oct. 6, 2022

(65) Prior Publication Data

US 2024/0166292 A1　　May 23, 2024

(30) Foreign Application Priority Data

Mar. 29, 2021　(AU) ................................ 2021201954

(51) Int. Cl.
| | |
|---|---|
| *B62J 50/25* | (2020.01) |
| *B62J 7/04* | (2006.01) |
| *B62J 9/28* | (2020.01) |
| *G09F 9/33* | (2006.01) |
| *G09F 27/00* | (2006.01) |

(52) U.S. Cl.
CPC ................. *B62J 50/25* (2020.02); *B62J 7/04* (2013.01); *B62J 9/28* (2020.02); *G09F 9/33*

(2013.01); *G09F 27/00* (2013.01); *B62K 2202/00* (2013.01); *B62K 2204/00* (2013.01)

(58) Field of Classification Search
CPC ..... B62J 50/25; B62J 9/28; B62J 7/04; B62K 2204/00; B62K 2202/00; G09F 27/00; G09F 9/33
USPC .......................................................... 701/36
See application file for complete search history.

(56) References Cited

U.S. PATENT DOCUMENTS

| | | | | |
|---|---|---|---|---|
| 9,701,359 | B2* | 7/2017 | Cervino ..................... | B62J 6/04 |
| 2014/0042200 | A1* | 2/2014 | Namani ..................... | B62J 9/23 |
| | | | | 361/679.01 |

(Continued)

OTHER PUBLICATIONS

PCT International Search Report and Written Opinion, PCT Application No. PCT/AU2022/050285, Apr. 19, 2022, 10 pages.

*Primary Examiner* — Yazan A Soofi

(74) *Attorney, Agent, or Firm* — Fenwick & West LLP

(57)　　ABSTRACT

An electrically powered, wheeled delivery vehicle including a transport container with integrated advertising displays. The transport container having a plurality of walls configured to define an enclosure having an interior adapted for receiving goods to be transported. One of the walls includes a door which can be opened and closed to allow access to the interior of the container. The transport container includes at least one integrated advertising display including a display screen and a controller. The controller is programmed to cause the display screen to display an advertising message. The advertising message can be a dynamic display or a static display.

28 Claims, 10 Drawing Sheets

(56)           References Cited

U.S. PATENT DOCUMENTS

2015/0202770  A1*   7/2015   Patron .................... G06Q 50/01
                                                      901/50
2019/0141280  A1*   5/2019   Bottomly ............ B60R 11/0235
2020/0070717  A1*   3/2020   Garden ................ G09F 21/048

* cited by examiner

VEHICLE WITH ADVERTISING DISPLAY

TECHNICAL FIELD

The present invention relates to pillion transport containers for scooters, bicycles and the like and particularly to a pillion transport container with integrated advertising.

BACKGROUND

Scooters with transport containers at the pillion, are known.

For example, known methods of food delivery conventionally include the use of an insulated container which can be strapped to a rear portion of the motorcycle or scooter. These containers are typically a foam, insulated bag in which to transport pizzas in pizza boxes from kitchen to a home consumer. These bags typically serve the purpose of transporting the pizza and attempting to maintain the pizzas hot.

It is also known to have an illuminated container to transport items attached or mounted at the pillion of a scooter. These illuminated containers are normally connected to the scooter's electrical power source.

It will be clearly understood that, if a prior art publication is referred to herein, this reference does not constitute an admission that the publication forms part of the common general knowledge in the art in Australia or in any other country.

Any discussion of background art throughout the specification should in no way be considered as an admission that any of the documents or other material referred to was published, known or forms part of the common general knowledge.

SUMMARY OF THE INVENTION

The present invention is directed to a vehicle with advertising display, which may at least partially overcome at least one of the abovementioned disadvantages or provide the consumer with a useful or commercial choice.

With the foregoing in view, the present invention in one form, resides broadly in a transport container for a delivery vehicle, the transport container having a plurality of walls configured to define an enclosure, having an interior portion adapted for receiving goods to be transported; and with at least one integrated advertising display in the form of a programmable display screen to display a static advertising message when the delivery vehicle is moving.

In another form the present invention resides in a pillion transport container with integrated advertising display, the pillion transport container including a plurality of walls configured to define an enclosure, having an interior portion adapted for receiving goods to be transported; and having at least one integrated advertising display in the form of a programmable display screen to display a static advertising message when the delivery vehicle is moving.

The transportable container will typically be adapted for transporting goods, the container in the form of a box, typically for attachment to a rear portion of a bicycle, scooter or tricycle, including electric powered bicycles, scooters or tricycles. However, the transportable container can be used to transport any type of goods, perishable or non-perishable, heated or ambient temperature.

Preferably, at least one external wall of the container is adapted for mounting the at least one integrated advertising display. The container will normally be pillion mounted but could be provided as a pannier for example.

In embodiments, the container includes a controller that is programmed to cause the display to display an advertising message, wherein content data indicative of the content of the advertising message is loaded into memory in the controller.

Preferably, the controller is adapted to receive data wirelessly including data indicative of the content of the advertising message.

In embodiments, the controller is configured to process data indicative of the geographic location of the vehicle and geofencing data loaded into the memory of the controller for determining the display of content according which one of a number of predetermined geographical zones the vehicle is located.

Preferably, the controller includes a module for communicating with a mobile telecommunications network for receiving data indicative of the geographical location of the vehicle for processing by the controller.

In embodiments, the controller collects and stores a log of data indicative of the journey of the vehicle and a log of the advertising messages displayed by the display screen.

Preferably, the log of data includes a log of the advertising messages displayed by the display screen and geolocation and time stamp data indicative of the locations and the times at which the advertising messages were displayed.

In embodiments, the log of data is processed to validate the delivery of advertising messages relative to a predetermined program.

Such embodiments of the invention are advantageous as they provide the ability for data indicative of the displayed advertising content to be uploaded a central server for processing and for validating the delivery of advertising content according to a predetermined program and/or according to geolocation and time of the day and/or date of the display occurring.

In preferred embodiments, a static image is displayed on the display when the vehicle is moving and a moving image is displayed on the display when the vehicle is stationary. Preferably, the controller is configured to determine if the vehicle is stationary or is moving.

In embodiments, the container includes a loudspeaker and audio playback device adapted to play sounds associated with the advertising message being displayed in the display.

The transport container can be used with and is typically mounted, preferably permanently to, a delivery vehicle. The delivery vehicle can take any form but according to the most preferred form, will be a scooter, bicycle, electric scooter/cycle, tricycle or similar vehicle as these types of vehicles are seeing increased usage in delivery space because of their manoeuvrability in traffic and the ease of parking and the like.

Preferably one of the plurality of walls is or includes a door which can be opened and closed to allow access to an interior portion of the container.

The container is preferably dimensioned to fit upon the delivery vehicle. Preferably, the container dimensions are such that the container is no wider than the width of the vehicle at the widest point of the container and even more preferred is that the container be as wide as possible without extending laterally past the extremities of the vehicle. In the preferred scooter embodiment it is preferred that the container be as wide as possible without extending laterally past the free ends of the handlebars on either side of the scooter.

The container is preferably generally rectangular and an even more preferred shape is generally cubic. The container will typically have a top wall, at least one bottom wall, left and right side walls, a forward wall and rear wall.

The top wall will preferably be substantially planar. Typically, the top wall of the container includes a generally rectangular wall portion which fits together with an upper, rearwardly extending wall portion formed as part of the forward wall and a similarly an upper and inwardly extending wall portion formed as a part of each of the left and right side walls.

The bottom wall will typically be shaped to correspond with at least a portion of the rear of the vehicle and preferably the scooter in the pillion area. A scooter typically has a pillion area provided behind the user's seat designed to correspond with the base wall shape of the preferred container.

The pillion area of a scooter preferably has a raised central rail, oriented coaxially with the longitudinal midline or axis of the scooter. A pair of downwardly depending shoulder portions are preferably provided from the raised central rail and a pair of lateral depressions at a level lower than the raised central rail are preferably provided, one on either side of the central rail. This configuration is preferred although the opposite configuration may be provided.

The base wall of the container is preferably a multipart wall with a number of wall portions at different angles to correspond to the shape provided in the pillion area of scooter. According to the preferred shape, a pair of outer, lateral depressions is provided on the bottom wall which form raised portions on the lower side of the bottom wall, one on either side of a central portion standing proud of the lateral depressions, the central portion on the lower side of the wall forming a depression. Again, this configuration is preferred although the opposite configuration may be provided.

When the container is mounted to the scooter, the outer container depressions preferably overly the lateral depressions of the pillion area whilst the central depression of the container receives the central rail of the pillion area. The respective surfaces on the container and pillion area on the scooter are designed to but each other and typically, the central rail is closely received within the central depression. This will typically form a close engagement between the container and pillion area to provide security and stability.

The container is normally attached to the pillion area of the scooter using elongate fasteners which preferably extend through the lateral depression of the base wall of the container. The raised central rail of the container preferably forms a resting surface upon which items placed into the container can rest although an interior base wall may be provided for this purpose. If provided, an interior base wall will also typically hide or obscure any fasteners used as well as hiding or obscuring the depressions and level the base of the container.

Preferably, the base of the container is mounted to be substantially horizontal.

It is preferred that the internal space of the container is defined by at least one and normally a number of interior walls and the external surface be defined by at least one and normally a number of exterior walls with the interior wall(s) spaced inwardly from the exterior wall(s). The interior walls of the container may be formed in a unitary manner such as by moulding as a single unit or core (with the door separately formed) and the external panelling/walls provided about the internal core.

The left and right side walls and the door in particular are normally configured as an interior side wall and an exterior sidewall or sidewall panel. A particularly preferred embodiment includes a sidewall with a sidewall panel therein or thereon.

The preferred interior side wall on each side is preferably substantially continuous. The preferred exterior sidewall will normally include an exterior sidewall surround and an opening or depression thereinto for the preferred programmable display screen (which will be explained further below).

Preferably, one or more sidewall panels may be provided to at least temporarily be inserted into the opening or depression in an exterior sidewall surround. These sidewall panels may be removable and/or replaceable. It is preferred that the sidewall panels are adapted to be releasably secured relative to the sidewall. In the preferred form, a depression is provided into the exterior sidewall and into which one or more sidewall panels are received and sized to fit closely within the depression. When fitted properly into the depression, the panel(s) will normally be flush with the sidewall.

The forward wall will preferably be shaped in order to provide a backrest for the user when seated on the seat of the scooter. Preferably, the forward wall of the container is arcuate when viewed in plan. Typically, the forward wall will be smooth for comfort. Cushioning or other padding may be provided in order to enhance the comfort of the user.

Typically, the forward wall of the container will extend below the level of the seat of the scooter.

Preferably the rear wall of the container will normally be or include a door or similar closure, preferably provided in a rear wall surround. The rear wall is typically configured similarly to the side walls but with the depression provided in the door member itself. The door member will preferably be received in a door frame formed with the remainder of the container. The door frame is preferably U-shaped with one or more hinges provided, preferably at a lower edge of the door and on the corresponding portion of the container to allow the door to open downwardly. When the door is closed, the enclosure is preferably substantially air tight although one or more vents (with or without extraction fans) may be provided to prevent undesirable build up of condensation within the container.

Preferably, the door is sized to make up the majority of the rear wall with relatively small side, top and bottom surround portions.

Preferably, the door member is hinged at the lower end thereof and the upper portion of the door member opens by pivoting the door member downwardly and outwardly. Preferably, a hinge is provided on either side of the door member and is preferably located in the lateral depressions in the container.

The shape of the container is preferably integrated into the overall appearance of the scooter with the fairings or other bodywork of the scooter matched to the container or the container is matched to the fairings or other bodywork in order to provide a substantially uniform overall appearance. It is preferred that the appearance has clean lines, minimising drag and providing an aesthetically pleasing container to view.

The walls of the container are preferably constructed from a polymeric material such as polycarbonate and/or ABS and/or polypropylene.

At least one and preferably a plurality of illumination sources may be provided and are electrically connected via wires or similar electric connection devices to the scooter's electrical system. One or more illumination sources or elements are preferably positioned between the exterior walls of the container, and their respective, adjacent interior walls. The illumination elements are typically actuated manually by a switch which can be located on the box, or on the motorcycle, and are powered by the adapted power supply system of the motorcycle.

The container may include on-board battery for powering the integrated advertising displays as described herein. In other embodiments, advertising displays are powered by a battery for powering the scooter.

The transport container of the present invention also includes at least one integrated advertising display in the form of a programmable display screen to display a static advertising message when the delivery vehicle is moving.

The integrated advertising display is "integrated" in terms of being integrated with either the transport container and/or the delivery vehicle. Preferably, the integration of the advertising display with the transport container and/or the delivery vehicle will allow the display to be operated from electrical power provided from the delivery vehicle itself (i.e. by a battery powering the drive motor of the delivery vehicle) or from a battery on-board the transport container. The transport container can be hardwired or permanently connected to the delivery vehicle or may be attachable to and detachable from the delivery vehicle as required.

Each advertising display includes an electronic display screen. The electronic display screen can be any type but is typically an LED panel screen or EF (electronic field) panel screen. An electronic display screen usually comprises the display device, circuitry, casing, and power supply to be connected to an external power source, preferably the delivery vehicle power supply system. The display device in most modern display screens is typically a thin film transistor liquid crystal display (TFT-LCD) thin panel. They are normally connected to a controller via VGA, DVI, DisplayPort, Thunderbolt, LVDS or other proprietary connectors and signals. Any type of electronic display screen can be used according to the present invention.

Preferably, a number of electronic display screens are provided on each transport container. Preferably three display screens are provided, one on the rear panel and one each on the lateral sides of the transport container. The display screens can be separately powered and controlled or alternatively, they may be powered from a single source and controlled separately or they may be powered from a single source and controlled together. The electronic display screens on a single transport container are typically connected such that if one or more of the electronic display screens suffers a failure, the others are not affected.

Each electronic display screen is typically mounted within a depression in an exterior wall. The electronic display screen is preferably removable but may be permanently fixed in the depression. Preferably, the display screens are located within the depression and a transparent cover or similar is placed over the top of the electronic display screen which will assist with protection of the display screen as well as holding the display screen relative to the container.

One or more seals can be provided in order to weatherproof the mounting of the display screen relative to the transportable container. The transparent cover is typically toughened in order to prevent damage. It is particularly preferred that the cover is used to secure the display screen within the depression. The cover is typically substantially planar. A circumferential seal will typically be provided on the side of the cover to be mounted to the transport container. The cover will typically be attached to the transport container using one or more fasteners, typically four threaded fasteners, one located at each corner of the cover. The fasteners may preferably be provided with tamper proof screws, one-way screws or screws with heads requiring a particular tool for removal so that the cover cannot be removed using conventional tools or removed quickly and easily by someone attempting to steal or damage the display screens.

Typically, the depression as described above in at least some of the walls of the transport container has a stepped periphery. Typically, a peripheral step will be provided which is spaced from but substantially parallel to the base of the depression and which is spaced from the surface level of the transport container wall. The cover will typically be located within the depression on the stepped periphery and the preferred circumferential seal will abut the stepped periphery to seal the display screen from weather and the like.

As mentioned above, the display screen can be any type. Typically, it is a powered, electronic display screen capable of displaying moving images according to instructions received from controller. The display screen and/or controller will normally be programmable. Normally, a controller is associated with each display screen but a single controller may control all of the screens on a single transport container. The controller may be separate from the screen or provided integrally therewith. The controller is responsible for receiving instructions and displaying content on the display screen. As mentioned above, the display will normally be static whilst the vehicle is moving. Preferably, the display screen will display a moving display whilst the vehicle is stationary.

Preferably, an actuator is provided to control changes of the display screen between the static mode and the moving display mode. A variety of types of actuator could be used for this purpose, and one particularly preferred actuator is an accelerometer which can detect when the vehicle is moving and when the vehicle is stationary and actuate the switch in modes accordingly. Other mechanisms may be used such as the use of GPS or other type of location system in order to detect motion and/or speed. Still further, the mode switching may be dependent upon whether the vehicle is idle or not and/or physically or electrically attached to an accelerator or similar for the vehicle.

The content to be displayed on the display screen is typically advertising content but other content may be provided. Normally, the advertising content is provided by the owner or operator of the vehicle who wishes to advertise their business whilst the vehicle is in transit. Normally, content will be designed and provided to the controller and/or display screen with instructions to display the content.

The controller will typically stop or pause the content when the vehicle starts moving. The controller may freeze the content at the point at which the content has arrived when the vehicle starts moving but preferably, there will be a least two content pieces provided, one for the moving display mode and one for the static mode. When the vehicle starts moving, the moving display mode switches to the static display mode in the static display mode displays the static content and when the vehicle stops, static mode switches to the moving display mode which commences play of the moving display. The moving display may commence from a particular point each time or alternatively, the moving display mode may simply be paused when the controller enters the static mode and play commences from the paused point when the controller switches back to the moving display mode.

Audio may be possible when the vehicle is stationary and typically, the audio will be provided with the display content. One or more speakers or other audio playback devices may be provided in the transport container and preferably, if provided, they are powered from the same power supply and controlled by the controller. If provided, speakers can be mounted in any location in any way relative to the transport container.

Typically, the content is loaded onto or into the controller in/or display screen and this may be accomplished in any way. The content can be provided wirelessly or alternatively, a storage device can be engaged with the control and/or display screen in order to upload and change the content.

Preferably, a software application may be provided for the operation and control of the content display. There are numerous software applications available in any of these may be used or alternatively, a bespoke, proprietary software application may be designed and provided. Normally, the software application will allow a system administrator (preferably not the operator of the vehicle) to change the parameters relating to the display of the content.

The provision of a transport container with an integrated advertising display at the rear of a scooter introduces an innovative outdoor mobile media particularly for goods delivery (e.g. including but not limited to food delivery). When an integrated advertising display is introduced, it not only requires an extra electrical power but also a stable voltage supply system to ensure that the integrated advertising display works well and consistently.

The integrated advertising display will typically increase the load on the power supply system in excess of that which the conventional vehicle power supply means is capable of creating.

In another aspect, the invention provides a method of operating a transport container for a delivery vehicle including at least one integrated advertising display including a display screen, the method includes: receiving in a controller display data; processing the display data in the controller; and displaying an advertising message on the display screen in response to the display data being processed in the controller.

Preferably, the display data is received and stored in memory in the controller.

In embodiments, the method includes receiving and processing in the controller data indicative of the geographic location of the vehicle and geofencing data and causing the display of an advertising message according which one of a number of predetermined geographical zones the vehicle is located.

In embodiments, the controller receives data indicative of the geographic location of the vehicle as a result of communication with a mobile telecommunications network.

In embodiments, the controller transmits data to a video control module to cause a static image to be displayed on the display when the vehicle is moving and a moving image displayed when the vehicle is stationary.

Preferably, the controller receives and processes motion data for determining if the vehicle is stationary or is moving.

In embodiments, the motion data is received from a motion sensor on the vehicle or from data received from the mobile telecommunications network.

In an embodiment, the controller causes the display to display an advertising message based on geographic location and time of the day and/or date parameters.

Embodiments of the invention are advantageous as they permit the targeting of advertising according to geographic location. For example, advertising targeted at higher socio-economic audiences can be programmed to be displayed when the vehicle enters higher socio-economic geographical zones and vice versa.

Embodiments of the invention are advantageous as they permit the targeting of advertising according to time of the day and/or date. For example, advertising targeted at older audiences or advertising that may be prohibited from display at certain times of the day can be programmed to be displayed in the evening and vice versa.

In yet another aspect, the invention provides a system for displaying content, the system including: a plurality of vehicles each comprising a transport container including at least one integrated display screen, a base station for a plurality of the vehicles; wherein a controller associated with the transport container is adapted to connect to a network at the base station and to communicate with a server through the network for receiving display data in the controller; processing the display data in the controller; and displaying an advertising message on the display screen in response to the display data being processed in the controller.

Preferably, the controller communicates with the server to provide unique identification information that identifies the vehicle and the server receives and validates the identification information and recognises a unique identifier of the vehicle. Preferably, the server is configured to transmit display content data unique to the identified vehicle to the controller via the network.

Preferably, the controller processes the display data and causes an advertising message to be displayed on the display screen.

In embodiments, the controller receives and processes data indicative of the geographic location of the vehicle and geofencing data and causes the display of an advertising message according which one of a number of predetermined geographical zones the vehicle is located.

In embodiments, the controller communicates with a mobile telecommunications network and receives data indicative of the geographic location of the vehicle.

In embodiments, the controller transmits data to a video control module to cause a static image to be displayed on the display when the vehicle is moving and a moving image displayed when the vehicle is stationary.

In embodiments, the motion data is received from a motion sensor on the vehicle or from data received from the mobile telecommunications network.

In an embodiment, the controller causes the display to display an advertising message based on geographic location and time of the day and/or date parameters.

Any of the features described herein can be combined in any combination with any one or more of the other features described herein within the scope of the invention.

BRIEF DESCRIPTION OF THE FIGURES

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION

Figure 1:
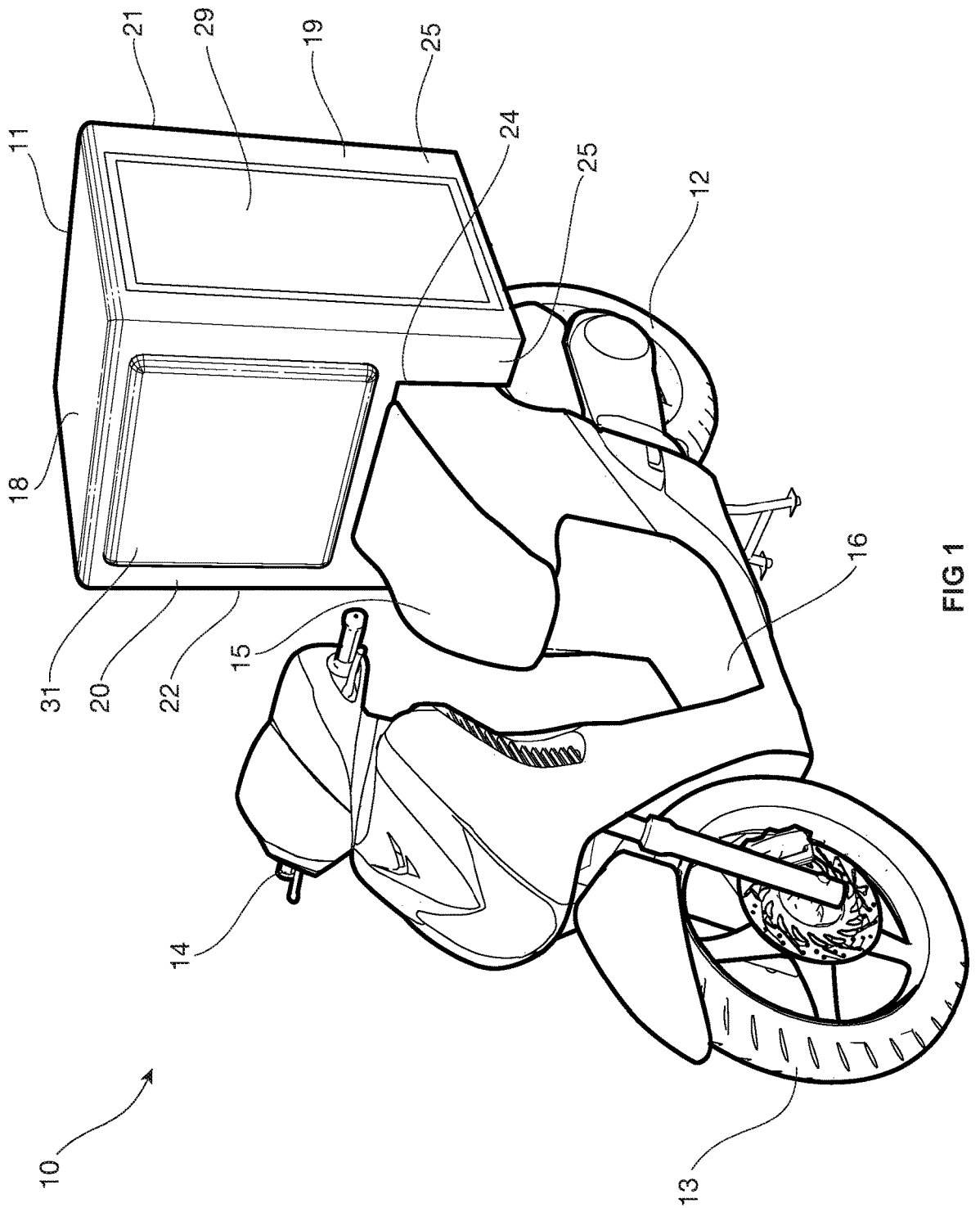
FIG. 1 is a perspective view of a scooter vehicle having a transport container with a number of integrated advertising displays according to a preferred embodiment of the present invention.

According to embodiments of the invention, forms of a pillion transport container with integrated advertising displays are provided.

The pillion transport container illustrated in the accompanying Figures includes a plurality of walls configured to define an enclosure, having an interior portion adapted for receiving goods to be transported; and having at least one integrated advertising display in the form of a programmable display screen to display a static advertising message when the delivery vehicle is moving.

Referring to FIGS. 1 to 4, there is shown an embodiment of the invention comprising a scooter vehicle 10 including a pair of wheels, one rear driven wheel 12 and one forward steering wheel 13, a set of handlebars 14 for steering the steering wheel 13 to direct the scooter vehicle 10, a seat 15 for a user, a step through frame, a platform 16 for a user's feet, bodywork panels fitted to the frame. A transport container 11 with integrated advertising displays 29 is provided at the rear of the scooter vehicle 10 in the pillion or load carrying area provided behind the user's seat 15.

The scooter vehicle 10 includes a drive motor, preferably an electric motor, for driving rotation of the driven wheel 12. The electric motor is also configured for regenerative braking whereby electrical power is generated when the user applies brakes to slow the scooter vehicle 10. The vehicle 10 includes an on-board power supply, such as a bank of rechargeable batteries. The vehicle 10 also includes a controller for controlling the operation of the electric motor and the power supply in response to control inputs from the user, namely inputs to accelerate and to brake the vehicle.

The integrated pillion transport container 11 includes a generally U-shaped lower portion to be attached to the scooter frame, the container having an enclosure defined by number of walls and having an interior portion adapted for receiving articles to be transported. At least one of the walls being a forward wall shaped to act as a back support for a user, and at least one illumination source located in the container for illuminating at least part of at least one external wall of the container, at least some of the walls to allow at least some of the illumination to pass therethrough.

The transportable container of the illustrated preferred embodiment is adapted for transporting goods, the container in the form of a box, typically for attachment to a rear portion of the electric scooter vehicle 10.

The dimensions of the container 11 are such that the container 11 is no wider than the width of the handlebars 14 at the widest point of the container 11.

The illustrated container 11 is generally cubic with a top wall 18, a multipart bottom wall 17, a pair of opposite side walls 19, 22, a forward facing front wall 20 and rearwards facing rear wall 21.

The top wall 18 is substantially planar. According to the illustrated embodiment, the top wall 18 is a generally rectangular wall portion that adjoins upper edges of the side walls 19, 22. The bottom wall 17 includes a recessed portion 28 that is shaped to correspond with the rear of the scooter 10 in the pillion area provided behind the user's seat 15.

The pillion area of the scooter has a raised central rail 24 oriented coaxially with the longitudinal midline or axis of the scooter 10. The recessed portion 28 of the bottom wall 17 of the container 11 is shaped to receive the raised central rail 24 in the pillion area of the scooter 10.

The container 11 includes a pair of downwardly depending shoulder portions 23, 25 disposed on laterally opposite sides of the recessed portion 28 of the bottom wall 17.

The bottom wall of the container is a multipart wall with wall portions at different angles to correspond to the shape of the raised central rail 24 provided in the pillion area of scooter.

When the container 11 is mounted to the scooter 10, raised central rail 24 is received within the recessed portion 28 and the downwardly depending shoulder portions 23, 25 extend downwardly over the lateral sides of the pillion area.

The container 11 is attached to the pillion area of the scooter using elongate fasteners which extend through the bottom wall 17 of the container 11.

Preferred embodiments of the container 11 have an internal space defined by interior walls and an external surface defined by exterior walls, with the interior walls spaced inwardly from the exterior walls.

Figure 5:
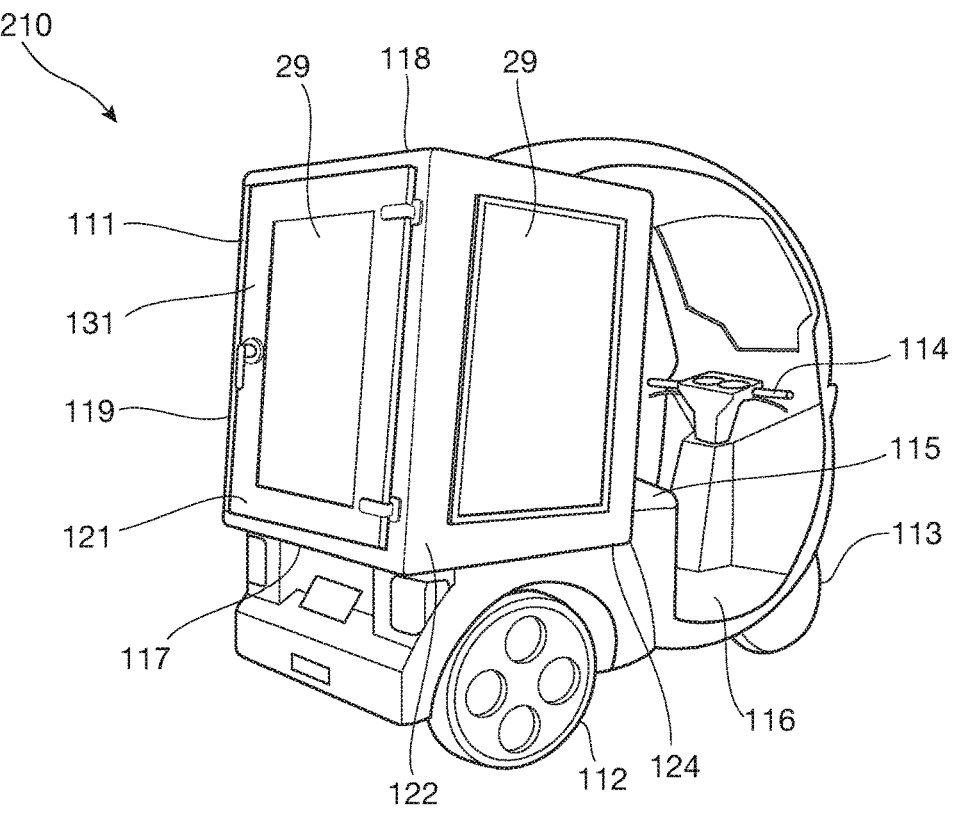
FIG. 5 is a rear perspective view of a trike vehicle having a transport container according to another embodiment of the present invention.
Figure 6:
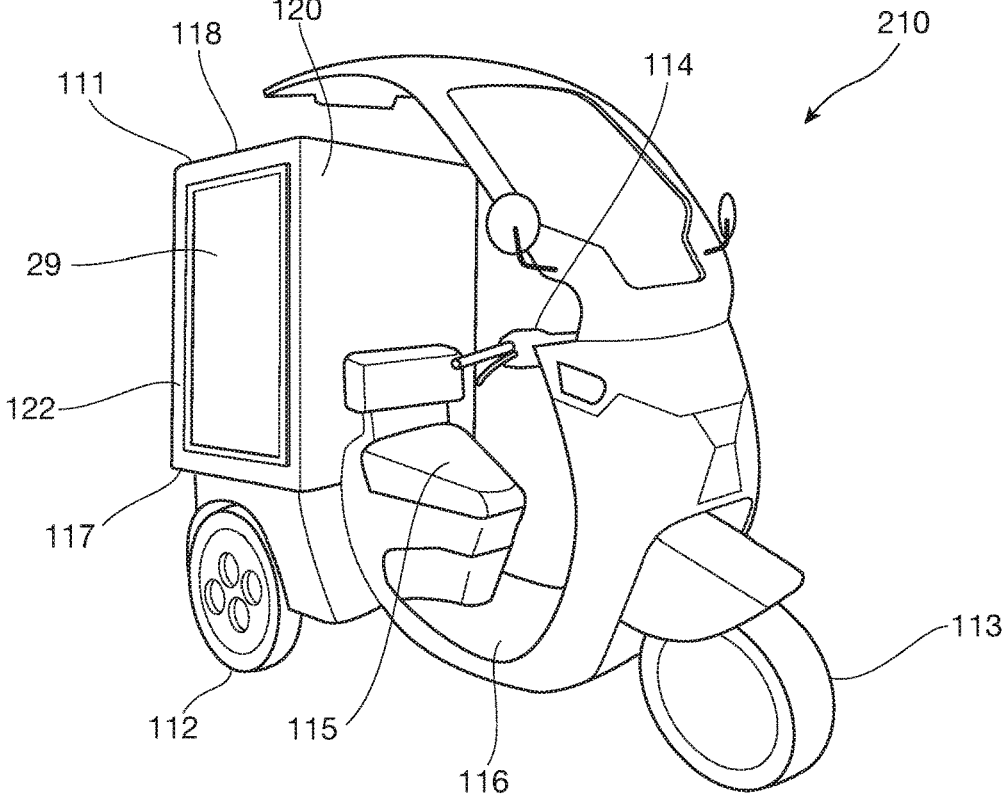
FIG. 6 is a forward perspective view of the vehicle and transport container of FIG. 5.

Referring to FIGS. 5 and 6, there is shown another embodiment of the invention comprising a trike vehicle 210. The trike vehicle 210 includes three wheels, a pair of rear driven wheels 112 and one forward steering wheel 113, a set of handlebars 114 for steering the steering wheel 113 to direct the scooter vehicle 110, a seat 115 for a user, a step through frame, a platform 116 for a user's feet, and bodywork panels fitted to the frame. The trike vehicle 110 includes a drive motor, preferably an electric motor, for driving rotation of the driven wheels 112. The electric motor is also configured for regenerative braking whereby electrical power is generated when the user applies brakes to slow the vehicle 110. The trike vehicle 110 includes an on-board power supply, such as a bank of rechargeable batteries. The trike vehicle 110 also includes a controller for controlling the operation of the electric motor and the power supply in response to control inputs from the user, namely inputs to accelerate and to brake the vehicle. A transport container 111 with integrated advertising displays 29 is provided at the rear of the trike vehicle 110 on a payload tray 124 behind the user's seat 15.

The transport container 111 of FIGS. 5 and 6 is generally cubic with a top wall 118, a bottom wall 117, a pair of opposite left and right side walls 119, 122, a forward facing front wall 120 and rearwards facing rear wall 121. The rearward wall 121 of the container 111 includes a door 131 or similar closure. Alternatively, the door 131 can be provided in the forward facing front wall 120. The container 111 includes an internal cavity for receiving and transporting goods (e.g. food or other goods).

The container 111 includes three of the display screens 29 and a controller configured for controlling the operation of the display screens 29 as described below.

Figure 8:
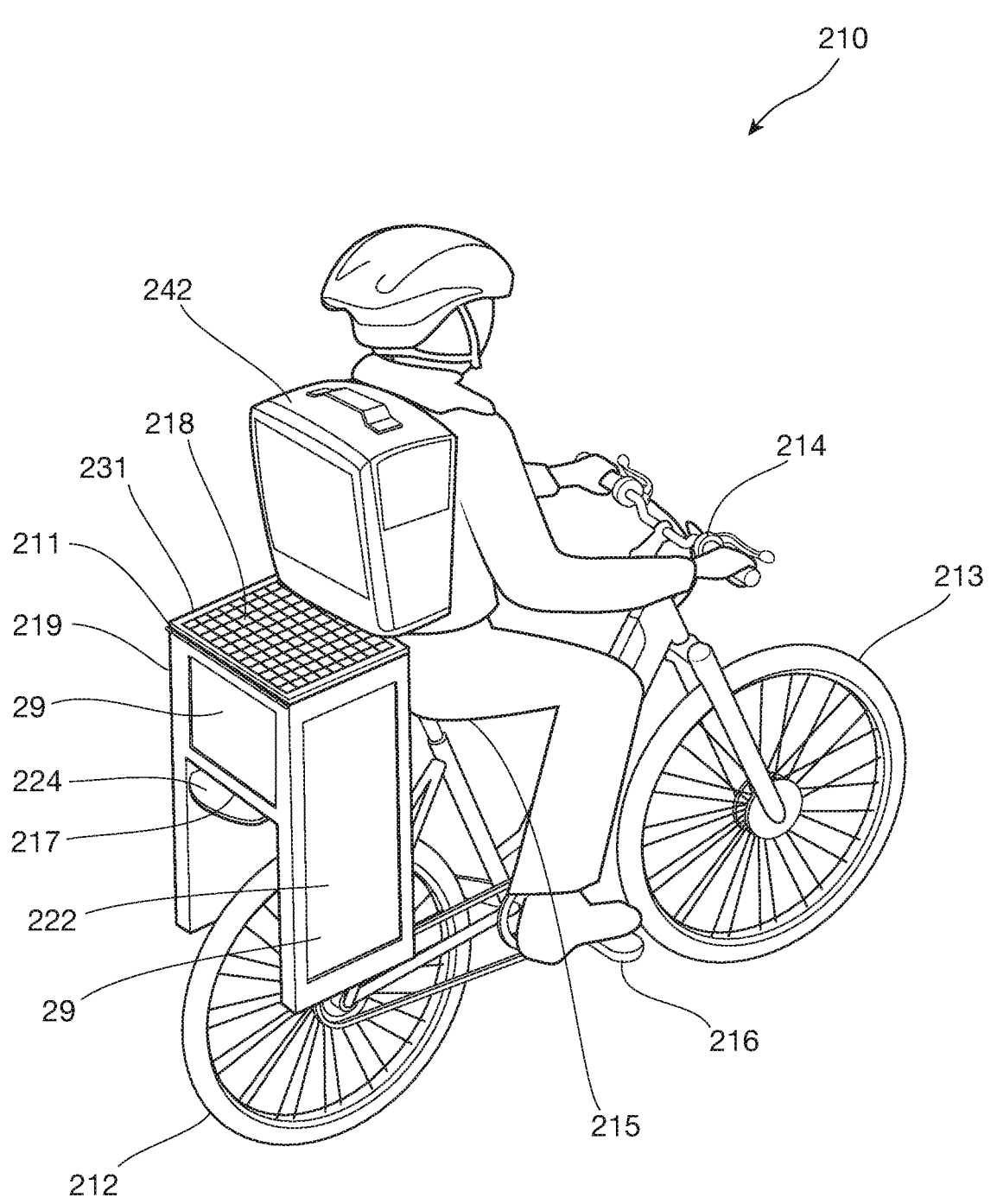
FIG. 8 is a rear perspective view of bicycle having a transport container according to another embodiment of the present invention.
Figure 9:
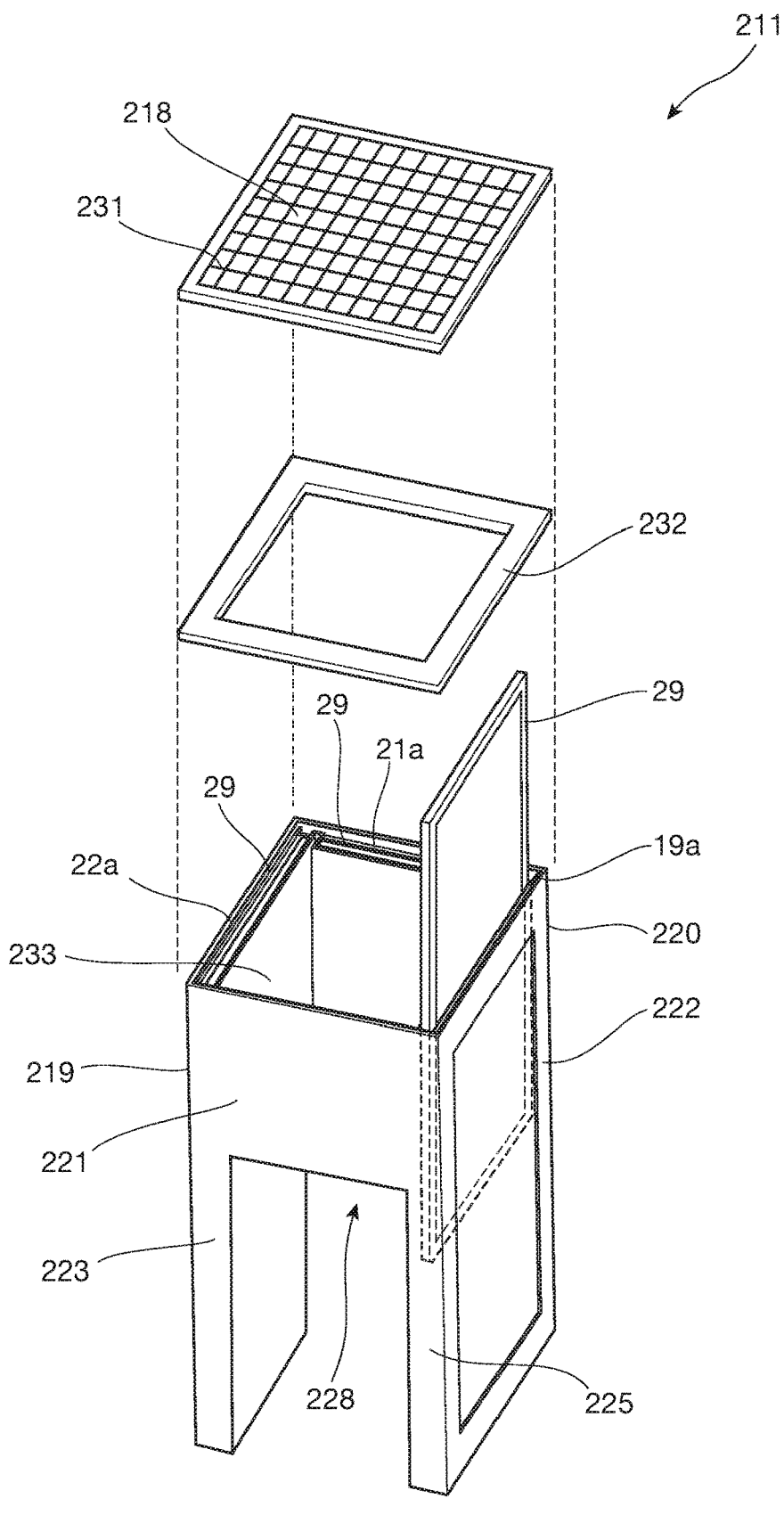
FIG. 9 is a forward and upper perspective view of the container of FIG. 8 illustrating some internal, obscured components in broken lines and with a top wall of the container removed and one of the display screen in a partial state of removal from the container.

Referring to FIGS. 8 and 9, there is shown another embodiment of the invention comprising a bicycle vehicle 210. The bicycle vehicle 210 includes two wheels, a rear driven wheel 212 and one forward steering wheel 213, a set of handlebars 214 for steering the steering wheel 213 to direct the bicycle vehicle 210, a seat 215 for a user, a step through frame, peddles 216 for a user's feet, and bodywork panels fitted to the frame. The bicycle vehicle 210 includes a drive motor, preferably an electric motor, for driving rotation of the driven wheels 212 in addition to or instead of drive provided by the use through the peddles 216. The electric motor is also configured for regenerative braking whereby electrical power is generated when the user applies brakes to slow the vehicle 210. The bicycle vehicle 210 includes an on-board power supply, such as a rechargeable battery. The bicycle vehicle 210 also includes a controller for controlling the operation of the electric motor and the power supply in response to control inputs from the user, namely inputs to accelerate and to brake the vehicle. A transport container 211 with integrated advertising displays 29 is provided at the rear of the bicycle vehicle 210 on a payload tray 224 behind the user's seat 15.

The transport container 211 of FIGS. 8 and 9 includes a top wall 218, a bottom wall 217, a pair of opposite left and right side walls 219, 222, a forward facing front wall 220 and rearwards facing rear wall 221. The top wall 218 of the container 211 includes a door 231 or similar closure and a gasket 232 around the upper edge of the side walls 219, 222 and front and rear walls 220, 221. The container 211 includes an internal cavity 233 for receiving and transporting food or other goods or items. When the container 211 is mounted to the bike 210, payload tray 224 is received within a recessed portion 228 of the bottom wall 217 and downwardly depending shoulder portions 223, 225 extend downwardly over the lateral sides of the rear wheel 212. The transport container 211 includes an on-board battery for powering the integrated advertising displays 29 as described herein. The battery for powering the bicycle vehicle 210 can also be operable for powering the transport container 211.

Alternatively, as illustrated in FIG. 8, the top wall 218 of the container 211 is adapted to support a food carrier 242 such as in the form of a back-pack being worn by the user of the bicycle vehicle 210. The top wall 218 of the container 211 includes a photovoltaic panel for recharging the on-board battery. The container 211 includes three of the display screens 29 and a controller configured for controlling the operation of the display screens 29 as described below.

Figure 7:
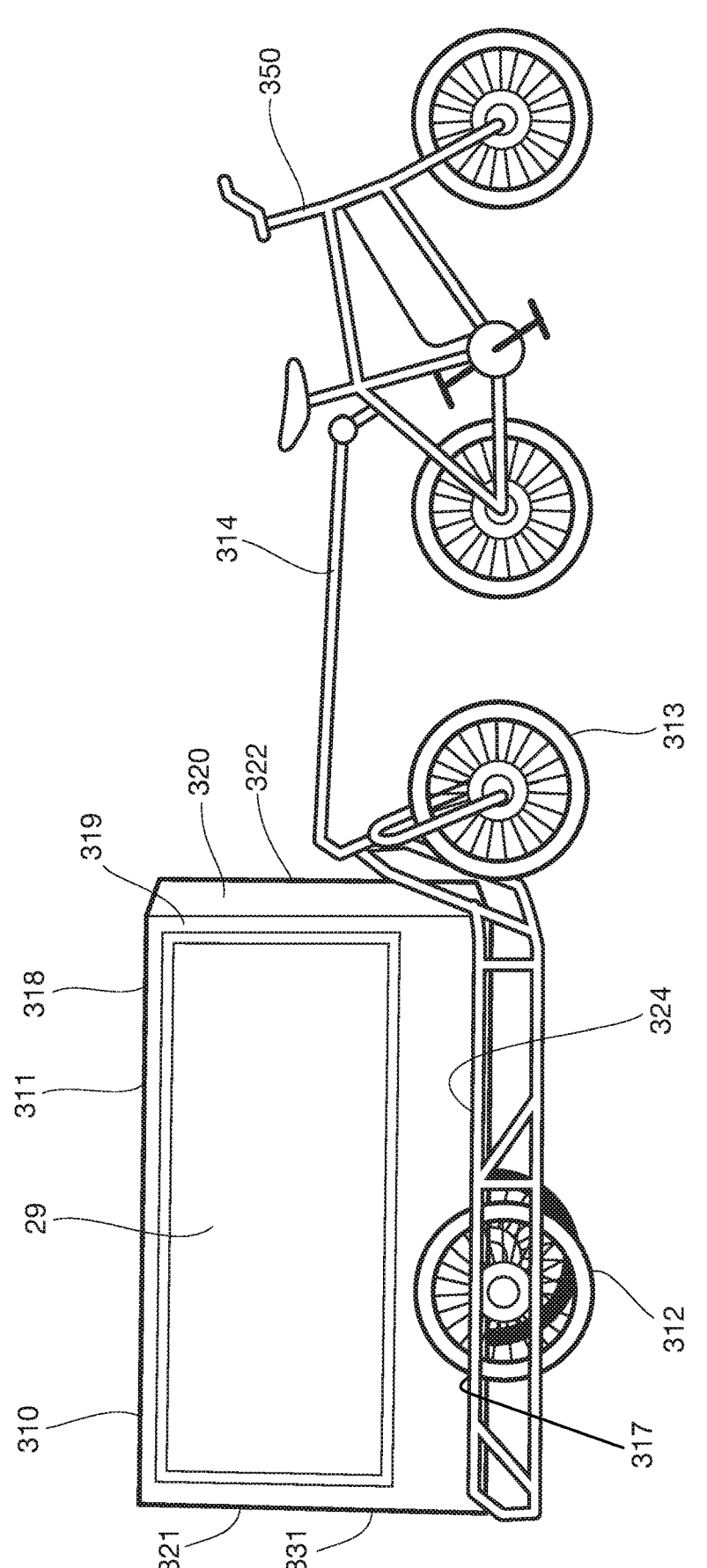
FIG. 7 is a side view of a trailer connected to a bicycle that together comprise a vehicle, the trailer includes a payload tray including a transport container with integrated advertising displays in accordance with an embodiment of the invention.

Referring to FIG. 7, there is shown another embodiment of the invention comprising a trailer 310 for connection to a bicycle or electronic bike 350 (e-bike). The trailer 310 includes three wheels, a pair of rear wheels 312 and one forward wheel 313 that is steerable and a link member 314 for connection to the rear of the bike 350. The trailer 310 includes a payload tray 324 including a transport container 311 with integrated advertising displays 29 in accordance with an embodiment of the invention provided thereon.

The transport container 311 of FIG. 7 includes an open top or a top wall 318, a bottom wall 317, a pair of opposite left and right side walls 319, 322, a forward facing front wall 320 and rearwards facing rear wall 321. The rearward wall 321 of the container 311 includes a door 331 or similar closure. Alternatively, the door 331 can be provided in any of the side walls 319, 322 or there may be no door 331 and access may be through an opening in the top wall 318. The container 311 includes an internal cavity for receiving and transporting goods or food or the like.

The container 311 includes three of the display screens 29 and a controller configured for controlling the operation of the display screens 29 as described below.

Referring to the embodiment of the container 11 of FIGS. 1 to 4, the side walls 19, 22 of the container 11 are configured as an interior side wall and an exterior sidewall or sidewall panel and electronic advertising display screens 29 are provided within each of sidewalls 19, 22 and the rear wall 21.

It is preferred that the display screens 29 are adapted to be releasably secured relative to the sidewall 19. In the preferred form each one of the side walls 19, 22 and the rear wall 21 respectively include a recess or slot 19a, 22a, 21a into which the display screens 29 are respectively received.

The forward wall 20 is shaped in order to provide a backrest for the user when seated on the seat 15 of the scooter 10. Preferably, the forward wall 20 of the container is arcuate or concave in shape and extends below the level of the seat 15 of the scooter 10 as illustrated in FIG. 1.

Figure 2:
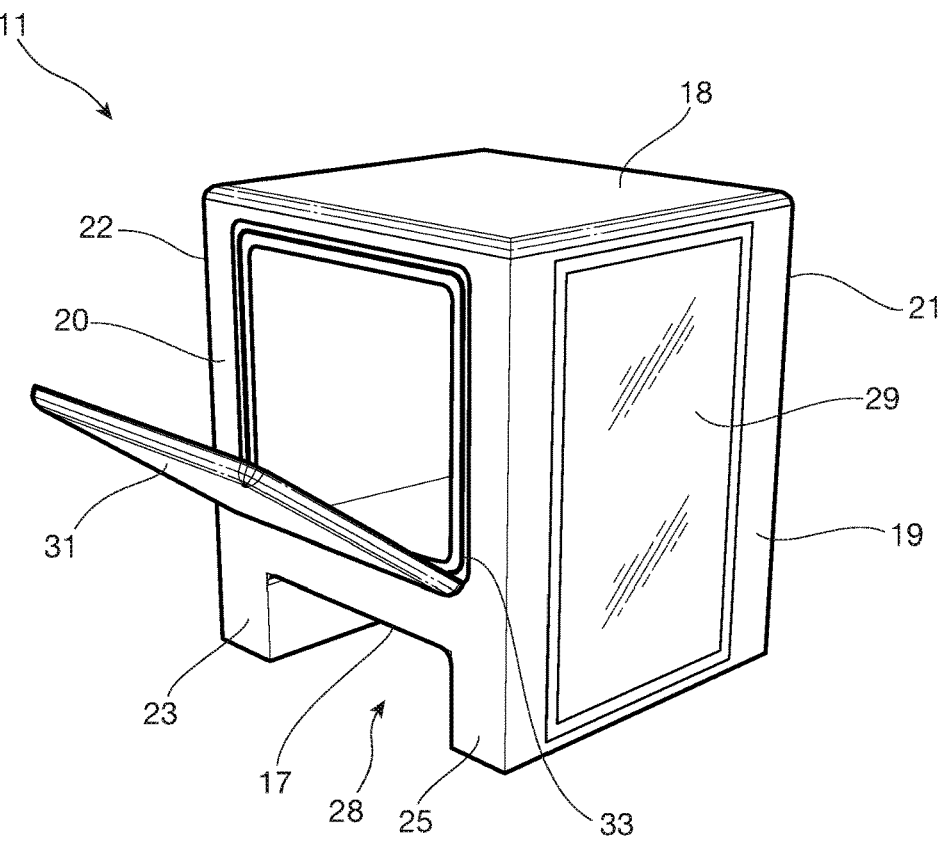
FIG. 2 is a rear perspective view of the transport container of FIG. 1.
Figure 3:
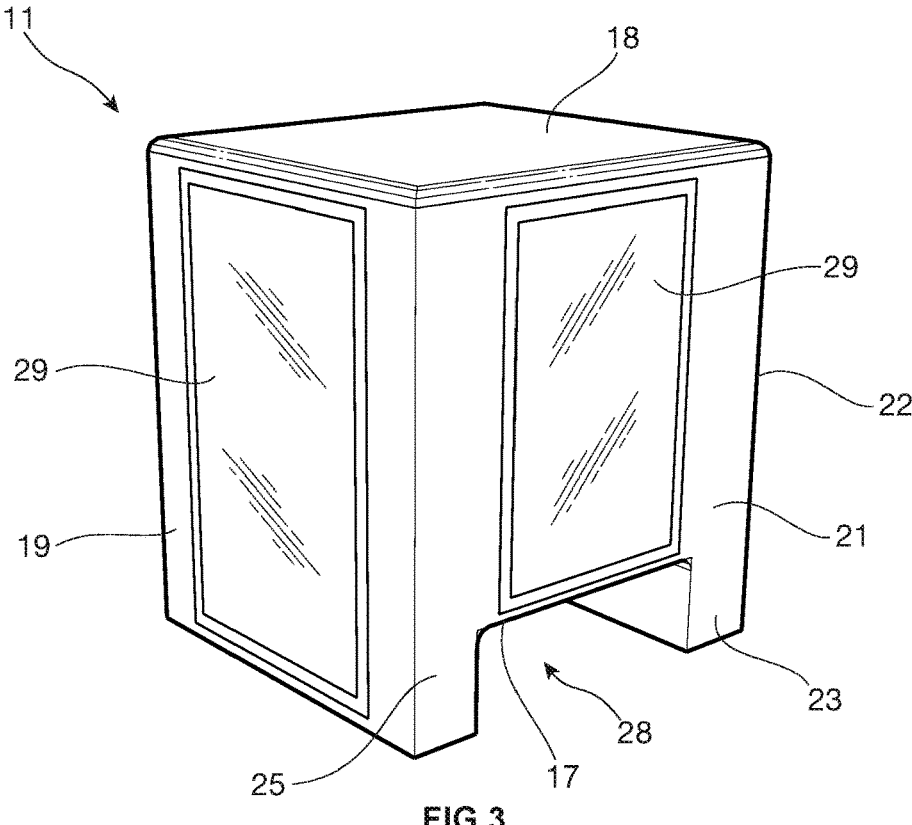
FIG. 3 is a forward perspective view of the transport container of FIG. 1.

The forward wall 20 of the container 11 illustrated in the Figures, particularly FIG. 2, includes a door 31 or similar closure provided in a forward wall surround 32. In another embodiment (not illustrated) The door 31 is provided in the rear wall 21 and the display screen 29 provided in the door 31 itself.

As illustrated in FIG. 2, the door 31 is sized to make up the majority of the forward wall 20 with relatively small side, top and bottom surrounds 32.

The illustrated door 31 is hinged at the lower end thereof and the upper portion of the door 31 opens by pivoting the door 31 downwardly and outwardly. A hinge 33 is provided on either side of the door member and preferably is located in the lateral depressions in the container.

The shape of the container is preferably integrated into the overall appearance of the scooter vehicle 10 with the fairings or other bodywork of the scooter vehicle 10 matched to the container 11 or the container 11 is matched to the fairings or other bodywork in order to provide a substantially uniform overall appearance. It is preferred that the appearance has clean lines, minimising drag and providing an aesthetically pleasing view.

Typically, a plurality of illumination sources are provided and are electrically connected via wires or similar electric connection devices to the scooter's electrical system.

One or more illumination sources or elements are preferably positioned between the exterior walls of the container, and their respective, adjacent interior walls. The illumination elements are typically actuated manually by a switch which can be located on the container, or on the scooter, and are powered by the adapted power supply system of the scooter.

The walls of the container are preferably constructed from a polymeric material such as polycarbonate and/or ABS and/or polypropylene.

The embodiments of the transport container 11, 111, 211, 311 described herein includes at least one display screen 29 to display video of a dynamically moving image when the scooter 10 is stationary or a static advertising message when the scooter 10 is moving.

The integration of the display screen 29 with the transport container 11 and/or the scooter 10 will allow the display screen to be operated from power provided either independently or from the delivery vehicle.

The electronic display screen 29 can be any type but typically is LED panel screen or EF (electronic field) panel screen. In an embodiment, the electronic display screen comprises the display device, circuitry, casing, and power supply to be connected to an external power source.

Figure 10:
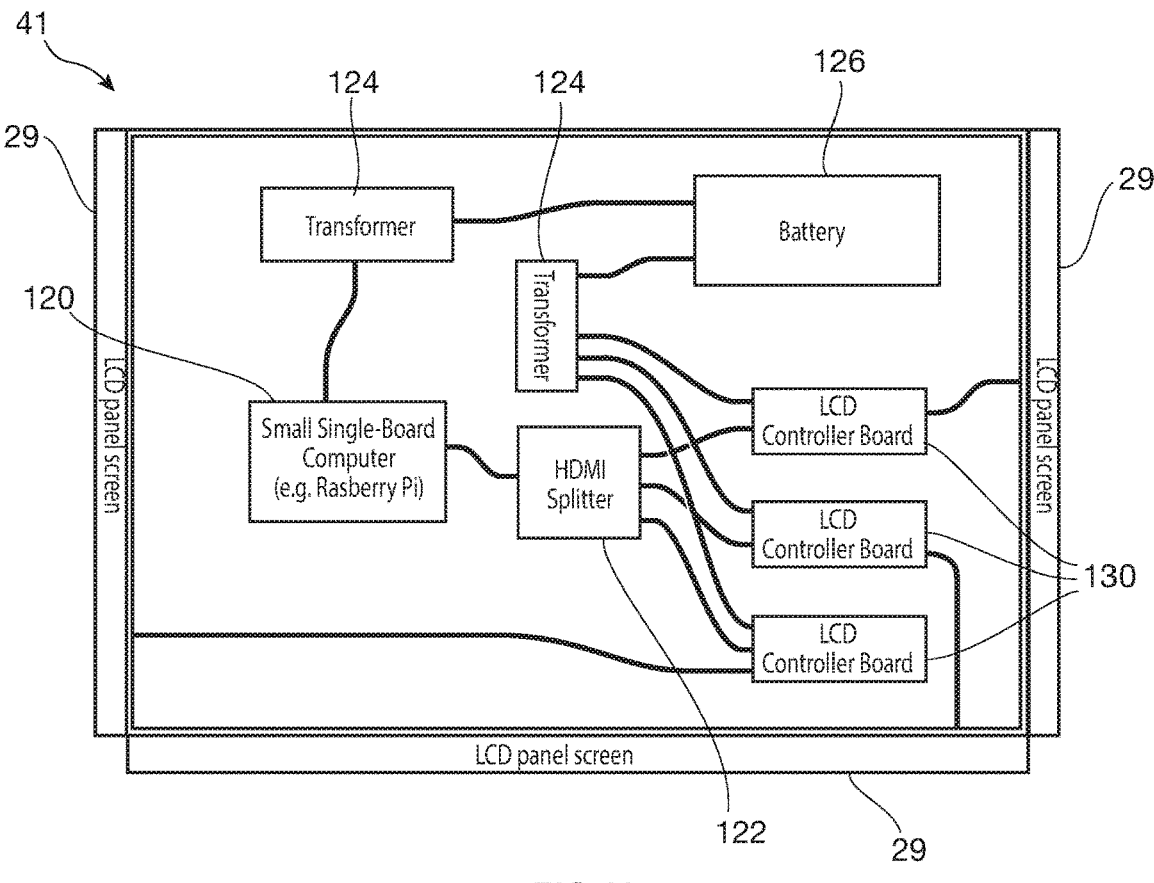
FIG. 10 is a schematic view of components of the container including three display screens and a controller, including components thereof for powering and for controlling the operation of the display screens.

Referring to FIG. 10, there is illustrated an embodiment of a controller 41 on board the embodiments of the container 11, 111, 211, 311 described herein. The controller 41 is configured for controlling the operation of the display screens 29 on board the embodiments of the container 11, 111, 211, 311. As described herein, the controller 41 includes a computer that is configured to be programmed with data including video data relating to content and other data for programming the display of content by the display screens 29.

Figure 11:
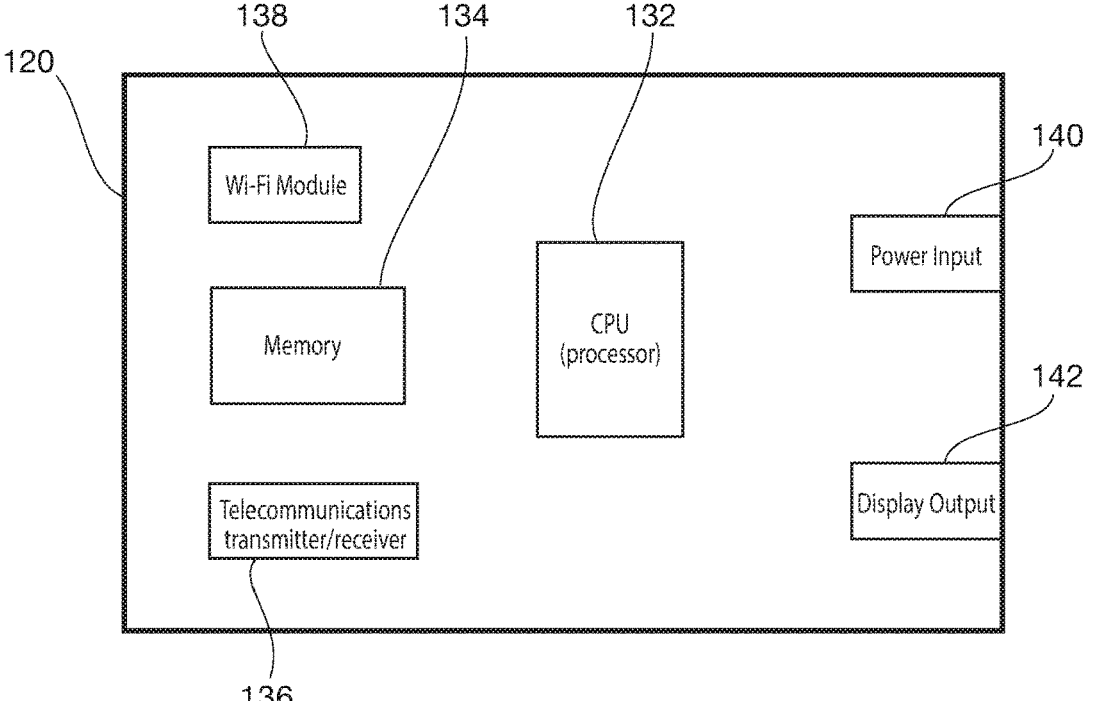
FIG. 11 is a schematic view of components of the container of FIG. 10.

In the embodiments illustrated in FIGS. 10 and 11, the controller 41 includes a computer control module 120, a video signal splitting module 122 and three video control modules 130. The computer control module 120 includes an on-board central processing unit 132, memory 134, a power input 140 and a display output 142. The power input 140 is connected to a transformer 124 which in turn is connected to a battery 126. The transformer 124 is configured to regulate the voltage of power from the battery 126 that is supplied to the computer control module 120.

The computer control module 120 also includes a wireless data communication module 138 for transmitting and receiving data through a wireless data transmission protocol such as any one or more of the Wi-Fi, Zigbee or Bluetooth protocols.

The computer control module 120 also includes a mobile telecommunications data communication module 136 for transmitting and receiving data through a mobile telecommunications network (i.e. a cell-phone network). The telecommunications data communication module 136 is configured to receive a subscriber identification module (SIM) and associated circuitry and programming in order to configure the computer control module 120 to interface and to transmit and receive data over the cell-phone network.

The display output connection 142 of the computer control module 120 is connected via a video data cable connection, preferably a HDMI cable, to a video signal splitting module 122. Each one of the video control modules 130 is connected via a video data cable connection, preferably a HDMI cable, to the video signal splitting module 122. Accordingly, the computer control module 120 is configured to output video data that is split by the video splitting module 122 and directed to each one of the video control modules 130.

Each one of the video control modules 130 are connected to a power supply for powering the operation of the video control modules 120 and the display screens 29. The power supply is comprised of another one of the transformers 124 which in turn is connected to the battery 126. The transformer 124 is configured to regulate the voltage of power from the battery 126 that is supplied to the video control modules 130.

If so, then a transformer, such as a switch mode power supply or a linear transformer, will normally be used to convert DC power at a voltage to DC power at another voltage, or to AC power at another voltage, which the illuminated display means and/or heat or cold source within the container 11 can use. It is preferred that the switch mode power supply will output a consistent DC output of about approximately 12V DC. A switch mode power supply is preferred. The preferred SMPS operates at high frequency isolating the input and output by using PWM (pulse width modulation). It allows for a much wider range of changing input voltage (Vi=12V~30V input voltage range) to supply a constant output voltage.

The switch-mode DC to DC converter (switch mode power supply) is preferred as it is more efficient that linear voltage regulation which dissipates unwanted power as heat. This efficiency is beneficial to increasing the life of the batteries in the container 11.

The video control modules 130 are adapted to operate and to cause the display screens 29 to display video corresponding to the video data output from the computer control module 120.

According to the preferred embodiment of the scooter vehicle 10 illustrated in FIGS. 1 to 4, three display screens 29 are provided, one on the rear wall 21 and one each on the lateral side walls 19, 22 of the transport container 11.

Figure 4:
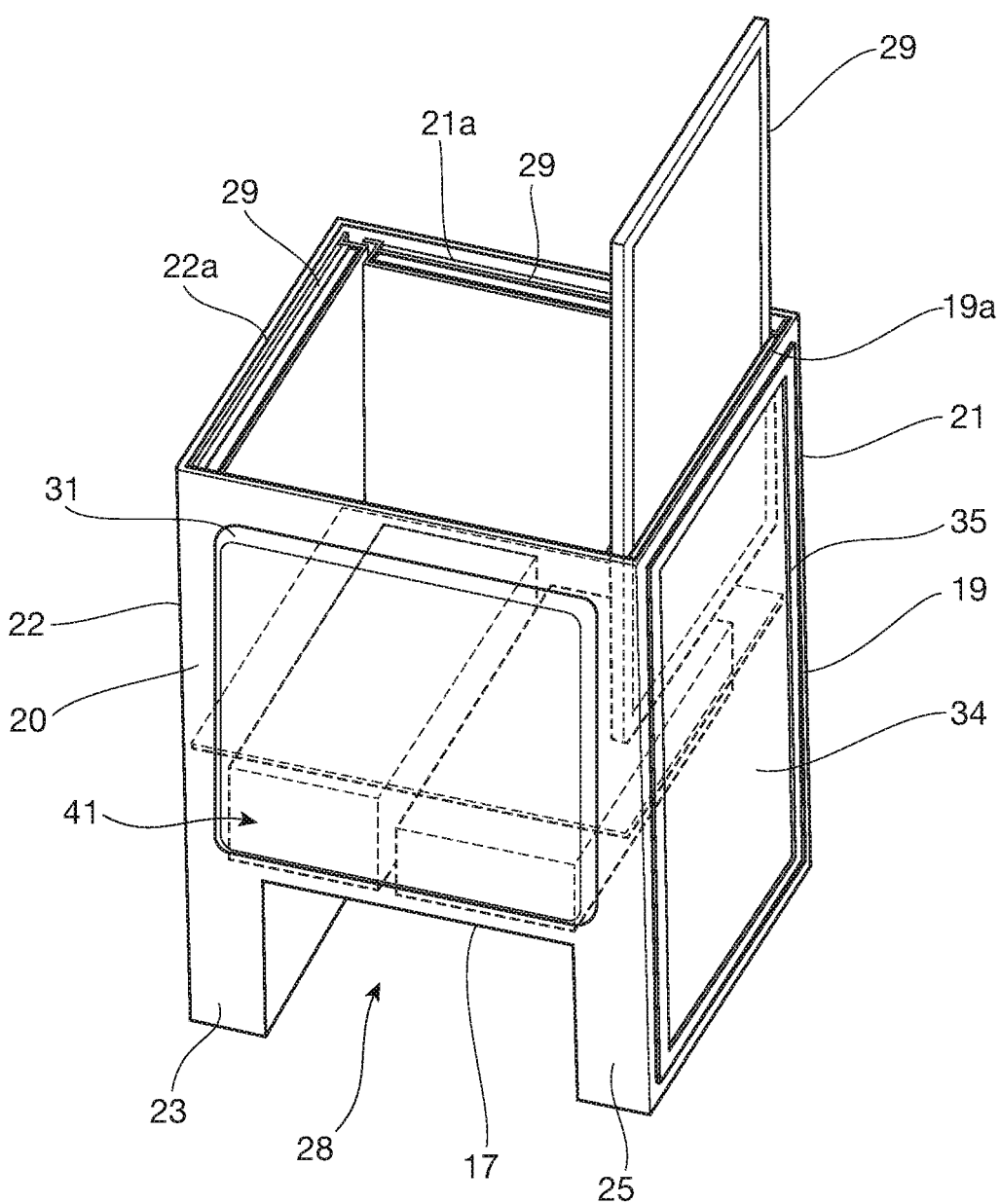
FIG. 4 is a rearward and upper perspective view of the container of FIG. 1 illustrating some internal, obscured components in broken lines and with a top wall of the container removed and one of the display screen in a partial state of removal from the container.

Each electronic display screen 29 is preferably mounted within the recesses 19a, 22a, 21a in the lateral side walls 19, 22 and the rear wall 21 of the transport container 11 as illustrated in FIG. 4. The electronic display screens 29 are preferably removable by being slid vertically within the recesses 19a, 22a, 21a but may be permanently fixed in the recesses 19a, 22a, 21a. Preferably, the display screens 29 are located within the recesses 19a, 22a, 21a and a transparent cover 34 is located over the display screen 29 which assists with protection of the display screen 29 as well as holding the display screen 29 relative to the container 11.

A peripheral seal 35 can be provided to weatherproof the mounting of the display screen 29 on the transportable container 11. The transparent cover 34 is toughened in order to prevent damage. It is particularly preferred that the cover 34 is used to secure the display screen 29 within the recesses 19a, 22a, 21a. The cover 34 is typically substantially planar. The cover 34 will typically be attached to the transport container using one or more fasteners 36, typically four, one located at each corner of the cover 34. The fasteners 36 may preferably be provided with one-way screws or screws with heads requiring a particular tool for removal so that the cover cannot be removed using conventional tools or removed quickly and easily by someone attempting to steal or damage the display screens.

Typically, the recesses 19a, 22a, 21a as described above is provided in at least some of the walls of the transport container as a stepped recess. Typically, a peripheral step 37 will be provided which is spaced from but substantially parallel to the transparent cover 34. As illustrated in FIG. 4, the transparent cover 34 will typically be located within the recesses 19a, 22a, 21a and the circumferential seal 35 will abut the stepped periphery 37 to seal the display screen 29 from weather and the like. In the embodiments of the container 11, 111, 211, 311 disclosed herein the electronic display screens 29 are preferably mounted in the manner described above with respect to the transport container 11 as illustrated in FIG. 4.

Figure 12:
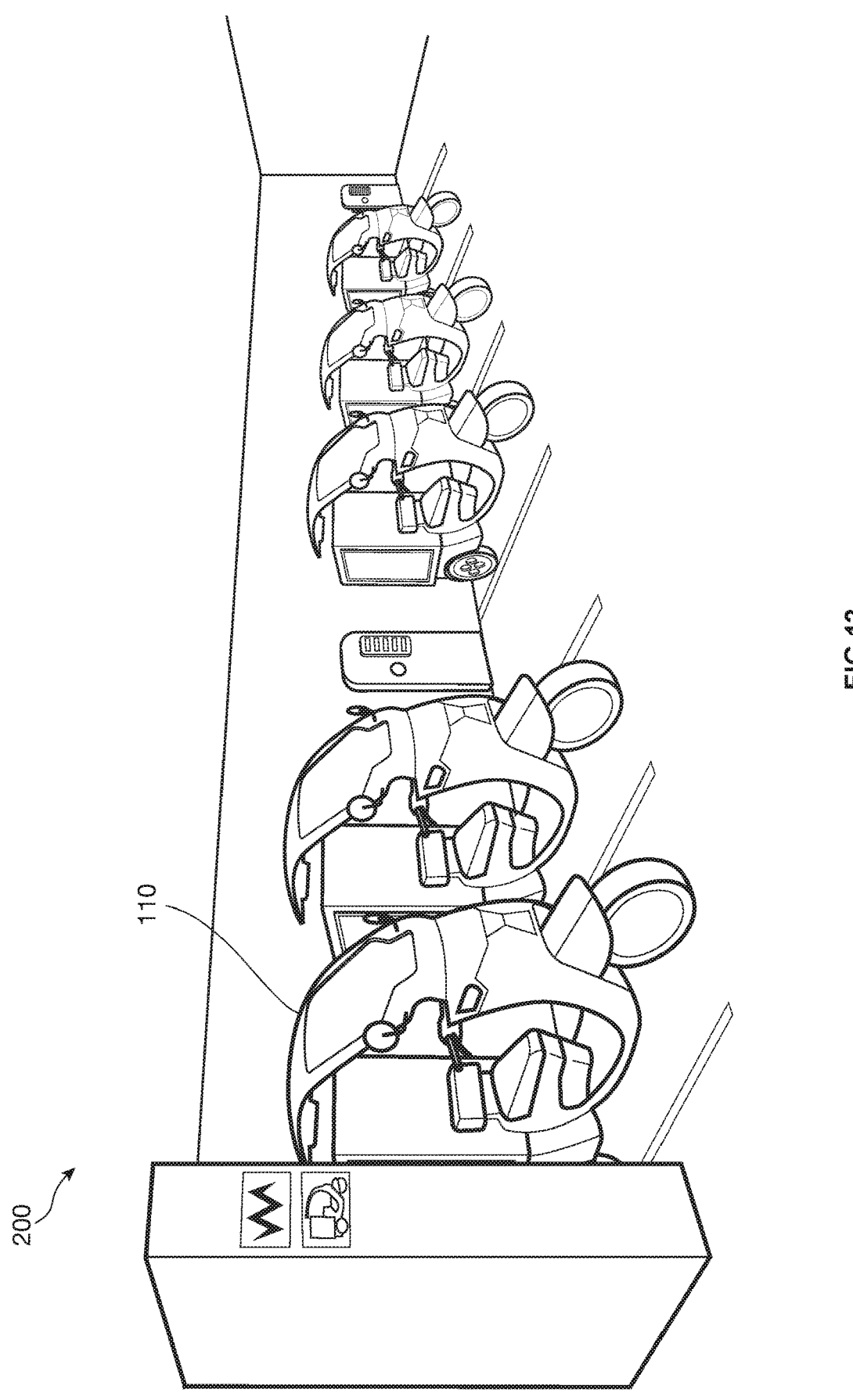
FIG. 12 illustrates a number of the vehicles of FIG. 5, although the vehicles of FIG. 1 or FIG. 8 may be substituted, parked at a designated station at which the controller is adapted to connect to a network either through a wired connection or through a wireless connection for charging and for data transfer.
Figure 13:
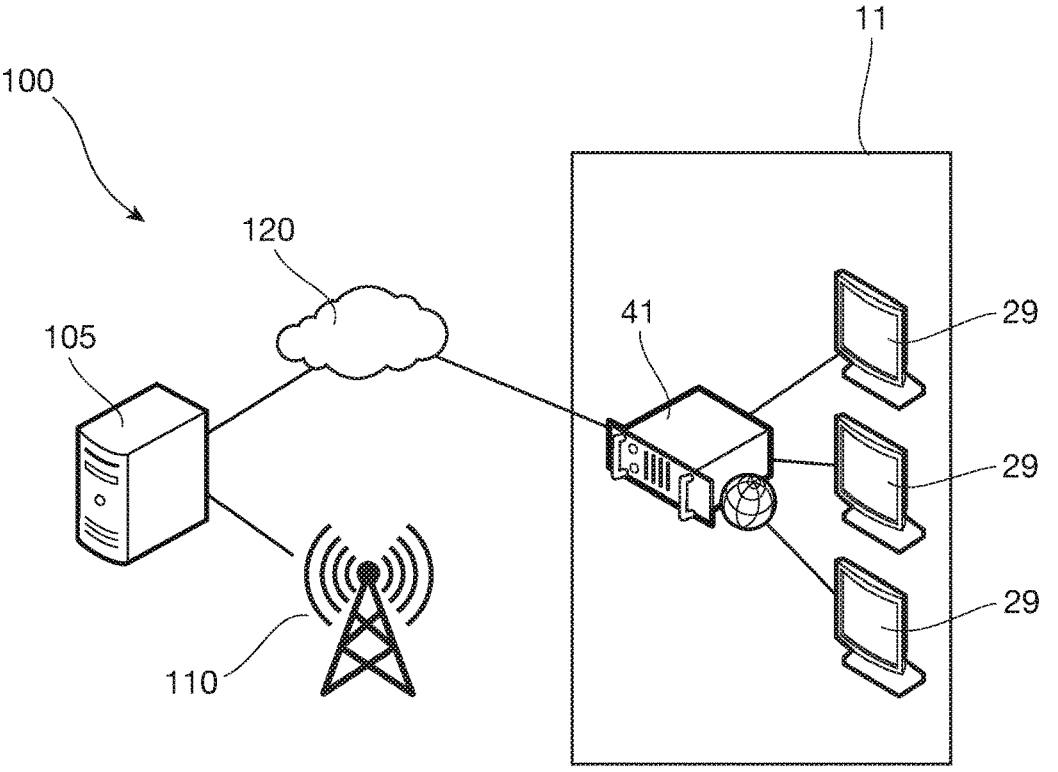
FIG. 13 is a schematic view of an embodiment of a system for compiling and for delivering or loading content to the controller.
Figure 14:
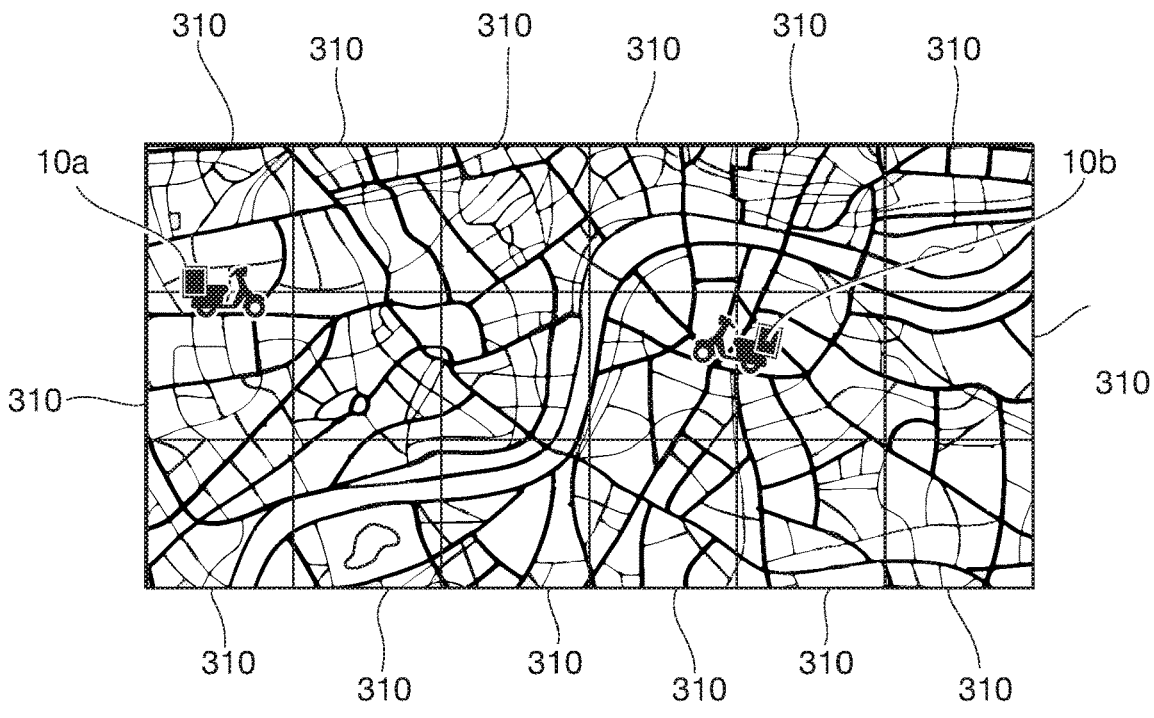
FIG. 14 illustrates a schematic representation of a method and system wherein data is geofenced to determine the displaying of content based on the geographic location of the vehicle according to geographic zones.

A schematic illustration of the system of operation of the powered, electronic display screens 29 capable of displaying moving images according to instructions received from the controller 41 is shown in FIGS. 12, 13 and 14. The display screen 29 and/or controller 41 are programmable. A single controller 41 controls all of the display screens 29 on a single transport container 11. The controller 41 may be separate from the screen 29 or provided integrally therewith.

According to embodiments of the invention, the controller 41 is configured for receiving instructions and for causing content to be displayed on the display screens 29. As described herein, the content will normally be static whilst the vehicle 10 is moving. Preferably, the display screens 29 will display content that is dynamic (i.e. comprised of a moving display) whilst the vehicle 10 is stationary.

Preferably, the controller 41 is configured to execute a switch function to control changes of the display screen between the static mode and the dynamic (i.e. moving) display mode. In an embodiment, the switch is responsive to data received from a movement sensor, preferably an accelerometer that detects when the vehicle is moving and when the vehicle is stationary and switches the display screen between the static and the dynamic modes accordingly.

In another embodiment, the switch is responsive to data from an on-board GPS module or preferably from the on-board mobile telecommunication module 136.

In another embodiment, the switch is coupled to a motion sensor associated with the drive motor of the vehicle. In embodiments the motion sensor is a motor speed sensor coupled to the drive shaft or armature of the motor or includes hall effect sensors embedded in the motor. In another embodiment, the motion sensor associated with the drive motor of the vehicle includes back EMF sensing executed in the controller 41 to thereby calculate the speed of rotation of the motor armature and thereby determine the speed of the vehicle.

The content to be displayed on the display screen is typically advertising content. Normally, the advertising content is provided by the owner or operator of the vehicle who wishes to display advertising whilst the vehicle is in transit. Preferably, content is designed and provided to the controller 41 and/or display screen 29 with instructions to display the content. The controller 41 is thereby programmed with the content and is configured with instructions for displaying the content.

In embodiments, the controller 41 is configured to include a dynamic display mode for when the vehicle is stationary and a static display mode for when the vehicle is moving. In an embodiment of the static display mode the controller 41 is configured to stop or to pause the content at the time when the vehicle starts moving.

In another embodiment, the controller 41 is provided with at least two forms of content, one for display when the vehicle is moving (i.e. in the static display mode) and one for when the vehicle is stationary (i.e. in the dynamic display mode). One such form of the content is preferably a dynamic version of an advertisement for display when the vehicle is stationary and the controller is in the dynamic display mode and a static version of the advertisement for when the vehicle is moving and the controller is in the static display mode.

When the vehicle starts moving, the controller 41 switches from the dynamic display mode to the static display mode which in turn causes the display to switch from the dynamic display to the static display in which the static content is displayed. When the vehicle stops, the controller 41 switches from the static display mode to the dynamic display mode which in turn causes the moving display mode which commences play of the moving display.

The dynamic display may commence from a particular point each time or alternatively, the dynamic display may simply be paused when the controller switches to the static mode and play commences from the paused point when the controller switches back to the dynamic display mode.

In embodiments, the content loaded and stored in the controller 41 includes audio content, in addition to or instead of the video content. In embodiments, the container 11 includes on-board audio reproduction components including one or more loudspeakers, and amplifier and a digital to analogue converter for converting digital audio data into an analogue audio signal that is provided to the amplifier. In an embodiment, the controller 41 is configured to cause the audio content to be played when the vehicle is stationary and to cease playing the audio content when the vehicle is moving, which is determined by the controller 41 using the means described herein.

Referring to FIG. 13, there is illustrated an embodiment of a system 100 for compiling and for delivering or loading content to the controller 41.

The content for display, which includes the dynamic content and the static content, is compiled in a server 105. The server 105 is configured to transmit data comprising the content to the controller 41 via a network connection 120.

As illustrated in FIG. 12, an embodiment of the invention provides a system including a designated station 200 for a plurality of the trikes 110, or the scooter vehicles 10 as the case may be, are parked at a designated station 200 the controller 41 is adapted to connect to the network 120 either through a wired connection or through a wireless connection (e.g. Wi-Fi). The controller 41 communicates with the server 105 to provide information to identify the vehicle 110. The server 105 validates the vehicle identification information and recognises the unique identifier of the vehicle 110. The server 105 is configured to transmit display content data to the controller 41 via the network 120.

FIG. 14 illustrates how embodiments comprising geofencing and geolocation operate. Display data is programmed including data indicative of advertising display content and geofencing data for determining the display of content based on the geographic location of the vehicle 10 according to geographic zones 310 for the advertising campaign. In embodiments, the geographic location of the vehicle 10 is determined in the foregoing manner.

The computer control module 120 is configured to either execute an on-board program for processing data from the mobile telecommunications module 136 for positional tracking by employing, for example, multilateration of radio signals between antennas of a mobile telecommunications network 110. Multilateration is the process of locating the vehicle 10 by accurately computing the time difference of arrival (TDOA) of a signal emitted from the vehicle 10 to three or more receivers mobile towers. Alternatively the computer control module 120 is part of a distributed processing network for positional tracking where at least part of the processing is carried out remotely and the computer control module 120 receives, via the on-board mobile telecommunication module 136, data indicative of the calculated position of the vehicle 10.

In another embodiment, the on-board mobile telecommunication module 136 is responsive to a signal received from the mobile telecommunications network 110 to generate a transmission that includes identification data. A remotely located processor determines the location of the vehicle 10 by employing, for example, multilateration of radio signals between antennas of the mobile telecommunications network 110. Data indicative of the calculated position of the vehicle 10 is then transmitted via the same mobile telecommunications network 110 which is then received by the on-board mobile telecommunication module 136. The positional data indicative of the calculated position of the vehicle 10 is thereby received at the computer control module 120.

Accordingly, the controller 41 is adapted to communicate through the connection with the mobile telecommunications network 110 to determine and to cause data to be generated that is indicative of the geographic location of the vehicle 10. Accordingly, with reference to FIG. 14, the controller 41 obtains data indicative of which one of a number of the predetermined geographic zones 310 one of the vehicles 10*a* is located within. The displaying of content by the container 11 is determined according to the geographic zone 311 within which the vehicle 10*a* is located. The controller 41 on board another vehicle 10*b* in another one of the zones 310 causes the display of content by the container 11 according to that zone 312, which depending on the programming of the display data can be the same or different to the content displayed by the container 41 one the other vehicle 10*a*.

In another embodiment, the controller 41 includes an on-board positioning system such as a GPS positioning module. The GPS positioning module is configured to determine the position of the vehicle by communicating with a GPS satellite network and to provide geographic location data.

In an embodiment, the display data includes scheduling data to determine the displaying of content by the vehicle 10 based on time of the day and/or date parameters for the campaign.

In an embodiment, the controller 41 has an on-board clock that provides time of the day and/or the date data. In another embodiment, on-board mobile telecommunication module 136 is adapted to receive data from the mobile telecommunications network 110 indicative of the time of the day and/or the date. The time of the day and/or date data is received in the processor 132 from the clock or from the mobile telecommunication module 136.

In an embodiment, the display content is configured to include a combination of geofencing and scheduling parameters to display content based on geographic location and time of the day and/or date parameters for the campaign.

The controller 41 is configured to process the data indicative of the geographic location of the vehicle 10 and/or the time of the day and/or the date in conjunction with the respective geofencing and/or scheduling data embedded in the display content data to cause the displays 29 to display content according to the parameters of the campaign.

In an embodiment, the display content data is stored in the memory 134 and the computer control module 120 is programmed to process the display content data, which includes geographical zone data. The geographical zone data includes programmed map data that is separated into different geographical zones. A different program for the display of content is ascribed to each geographical zone according to the parameters of the campaign. For example, with reference to FIG. 14, when the vehicle 10 moves from one geographical zone 310 to another geographical zone 310 the processor 132 will determine according to the positional data and the geographical zone data which program for the display of content is associated with the new zone and will cause the display screens 29 to display the appropriate content.

Furthermore, in embodiments, the display of content is determined according to geolocation criteria. In these embodiments, content is programmed in the controller 41 that is configured for display according to precise geolocation of the vehicle 10 as opposed to broader geofencing or zone based criteria.

Embodiments of the invention are advantageous as they permit the targeting of advertising according to geographic location. For example, advertising targeted at higher socio-economic audiences can be programmed to be displayed when the vehicle enters higher socio-economic geographical zones and vice versa.

Embodiments of the invention are advantageous as they permit the targeting of advertising according to time of the day and/or date. For example, advertising targeted at older audiences or advertising that may be prohibited from display at certain times of the day can be programmed to be displayed in the evening and vice versa.

In embodiments, the controller 41 collects and stores a log of data indicative of the journey of the vehicle 10, 110, 210, 310, including relative to geographic zones 310, and a log of the advertising messages displayed by the display screens 29. The log of data includes a log of the advertising messages displayed by the display screen and geolocation and time stamp data indicative of the locations and the times at which the advertising messages were displayed.

The log of data is uploadable from the controller 41 to the server 105, such as when the scooter vehicle 10 is parked at a designated station 200 and the controller 41 is connected to the network 120. The uploaded log of data indicative of the displayed advertising content is processed in the central server 105 for a number of purposes, including for validating the delivery of advertising content according to a predetermined program. In an embodiment, the predetermined program includes a program for the display of content by one or more of the vehicles 10, 110, 210, 310 according to geolocation and/or time and/or date of the display occurring.

As illustrated in FIG. 13, the content can be provided wirelessly 42 or alternatively, a data storage device such as a flash drive (not shown) can be engaged with the controller 41 to upload the display data. In embodiments, such as is illustrated in FIGS. 12 and 13, when the scooter vehicle 10 is parked at a designated station 200 the controller 41 is adapted to connect to the network 120 either through a wired connection or through a wireless connection (e.g. Wi-Fi). As described above, the controller 41 communicates with the server 105 to provide information to identify the vehicle 10. The server 105 validates the vehicle identification information and recognises the unique identifier of the vehicle 10. The server 105 is configured to transmit display content data to the controller 41 via the network 120. The display content data is stored in the memory 134.

The provision of a transport container with an integrated advertising display at the rear of a scooter vehicle introduces an innovative outdoor mobile media particularly for goods delivery. When an integrated advertising display is introduced, it not only requires an extra electrical power but also a stable voltage supply system to ensure that the integrated advertising display works well and consistently.

In embodiments in which the scooter vehicle 10 is powered by an electric motor a rechargeable battery for powering the motor also supplies some or all of the input electrical energy for the container 11. In embodiments, some or all of the input electrical energy is supplied by an alternative supply such from photovoltaic cells converting solar energy from the sun at daytime into electrical power.

Although the invention has been described with reference to particular examples, it will be appreciated by those skilled in the art that the invention may be embodied in many other forms. For example, the box 10 may be configured for delivery of any products, such as automotive parts and accessories, computer parts and accessories, stationary, etc. In these cases, the heat source would either be removed, or simply not actuated.

In the present specification and claims (if any), the word 'comprising' and its derivatives including 'comprises' and 'comprise' include each of the stated integers but does not exclude the inclusion of one or more further integers. Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places. Throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

While various embodiments of the invention have been set forth above, it will be apparent to those skilled in the art that various modifications and variations can be made in the present invention without departing from the scope or spirit of the invention. Thus, it is intended that the present invention cover such modifications and variations as fall within the scope of the appended claims and their equivalents.

The invention claimed is:

1. An electrically powered, wheeled delivery vehicle including a transport container having a plurality of walls configured to define an enclosure having an interior adapted for receiving goods to be transported, one of the plurality of walls includes a door which can be opened and closed to allow access to the interior of the container, the transport container including at least one integrated advertising display including a display screen and a controller, wherein the controller is adapted to cause the display screen to display an advertising message, wherein the controller is configured to process data indicative of a geographic location of the vehicle and geofencing data loaded into a memory of the controller for determining the display of content according to which one of a number of predetermined geographical zones the vehicle is located, and wherein the controller collects and stores a log of data indicative of a journey of the vehicle and a log of advertising messages displayed by the display screen.

2. A transport container for a delivery vehicle, the transport container having a plurality of walls configured to define an enclosure having an interior adapted for receiving goods to be transported wherein one of the plurality of walls includes a door which can be opened and closed to allow access to the interior of the container, the transport container including at least one integrated advertising display including a display screen and a controller, wherein the controller is adapted to cause the display screen to display an advertising message, wherein the controller is configured to process data indicative of a geographic location of the vehicle and geofencing data loaded into a memory of the controller for determining the display of content according to which one of a number of predetermined geographical zones the vehicle is located, and wherein the controller collects and stores a log of data indicative of a journey of the vehicle and a log of advertising messages displayed by the display screen.

3. The transport container of claim 2, wherein the transport container includes three display screens, one display screen on a rear wall and one display screen each on lateral side walls of the transport container.

4. The transport container of claim 2, wherein the display screen includes an electronic display screen including an LED panel screen, an EF (electronic field) panel screen or a thin film transistor liquid crystal display (TFT-LCD) thin panel including the display device, circuitry, casing, and power supply to be connected to a power source.

5. The transport container of claim 2, wherein the display screen is connected to the controller via VGA, DVI, DisplayPort, Thunderbolt or LVDS connectors.

6. The transport container of claim 3, wherein the display screens are separately powered and controlled or they are powered from a single source and controlled separately or they are powered from a single source and controlled together.

7. The transport container of claim 3, wherein each display screen is mounted within a recess or opening in an exterior surface of a respective one of the walls of the transport container.

8. The transport container of claim 7, wherein a transparent cover is placed over each display screen to seal the recess or opening in the wall.

9. The transport container of claim 8, wherein the recess or opening in the wall has a stepped periphery for receiving edges of the transparent cover and to provide a circumferential seal therebetween.

10. The transport container of claim 2, wherein the controller is programmed to cause the display screen to display the advertising message, wherein content data indicative of the content of the advertising message is loaded into the memory in the controller.

11. The transport container of claim 10, wherein the controller is adapted to receive data wirelessly including data indicative of the content of the advertising message.

12. The transport container of claim 2, wherein the controller includes a module for communicating with a mobile telecommunications network for receiving data indicative of the geographical location of the vehicle for processing by the controller.

13. The transport container of claim 2, wherein the log of data includes the log of the advertising messages displayed by the display screen and geolocation and time stamp data indicative of the locations and the times at which the advertising messages were displayed.

14. The transport container of claim 2, wherein the log of data is processed to validate the delivery of advertising messages relative to a predetermined program.

15. The electrically powered, wheeled delivery vehicle of claim 1, wherein a static image is displayed on the display screen when the vehicle is moving and a moving image is displayed on the display screen when the vehicle is stationary.

16. The transport container of claim 2, wherein the controller is configured to determine if the vehicle is stationary or is moving.

17. The electrically powered, wheeled delivery vehicle of claim 1, further including a loudspeaker and audio playback device adapted to play sounds associated with the advertising message being displayed in the display screen.

18. The electrically powered, wheeled delivery vehicle of claim 1, wherein the door is provided in a forward facing wall, a rearwards facing wall or a laterally sidewards facing wall of the container.

19. The transport container of claim 2, wherein the delivery vehicle is any one of a bicycle, an electric scooter, an electric bicycle and an electric tricycle.

20. The delivery vehicle of claim 19, wherein a rechargeable battery for powering the vehicle is also operable to power the display screen.

21. A method of operating a transport container for a delivery vehicle including at least one integrated advertising display including a display screen, the method including receiving in a controller display data;

processing the display data in the controller; and displaying an advertising message on the display screen in response to the display data being processed in the controller, wherein the controller is configured to process data indicative of a geographic location of the vehicle and geofencing data loaded into a memory of the controller for determining the display of content according which one of a number of predetermined geographical zones the vehicle is located, and wherein the controller collects and stores a log of data indicative of a journey of the vehicle and a log of advertising messages displayed by the display screen.

22. The method of claim 21, wherein the display data is received and stored in the memory in the controller.

23. The method of claim 21, including receiving and processing by the controller data indicative of the geographic location of the vehicle and geofencing data and causing the display of the advertising message according which one of a number of predetermined geographical zones the vehicle is located.

24. The method of claim 23, wherein the controller receives data indicative of the geographic location of the vehicle as a result of communication with a mobile telecommunications network.

25. The method of claim 21, wherein the controller transmits data to a video control module to cause a static image to be displayed on the display screen when the vehicle is moving and a moving image displayed when the vehicle is stationary.

26. The method of claim 25, wherein the controller receives and processes motion data for determining if the vehicle is stationary or is moving.

27. The method of claim 26, wherein the motion data is received from a motion sensor on the vehicle.

28. A system for displaying content, the system including: a plurality of vehicles each comprising a transport container including at least one integrated display screen, a base station for a plurality of the vehicles; wherein a controller associated with the transport container is adapted to connect to a network at the base station and to communicate with a server through the network for receiving display data in the controller; processing the display data in the controller; and displaying an advertising message on the display screen in response to the display data being processed in the controller, wherein the controller is configured to process data indicative of a geographic location of the vehicle and geofencing data loaded into a memory of the controller for determining the display of content according which one of a number of predetermined geographical zones the vehicle is located, and wherein the controller collects and stores a log of data indicative of a journey of the vehicle and a log of advertising messages displayed by the display screen.

* * * * *